United States Patent Office 3,257,465
Patented June 21, 1966

3,257,465
SECONDARY ACETYLENIC CARBINOLS
Morton W. Leeds, Murray Hill, and Henry L. Komarowski, Watchung, N.J., assignors, by mesne assignments, to Cumberland Chemical Corporation, New York, N.Y., a corporation of Delaware
No Drawing. Continuation of application Ser. No. 799,453, Mar. 16, 1959. This application May 31, 1963, Ser. No. 284,330
4 Claims. (Cl. 260—618)

This is a continuation of application Serial No. 799,453, filed March 16, 1959, now abandoned, which, in turn, is a continuation-in-part of application Serial No. 599,918, filed July 25, 1956, now abandoned.

This invention relates to unsaturated or acetylenic secondary carbinols and to a method of making the same. More specifically, the invention relates to an improved method of reacting sodium acetylide with an aldehyde in selective organic diluents or reaction media to obtain a secondary acetylenic carbinol.

It has long been known that sodium acetylide will react with aldehydes in various reaction media to form secondary acetylenic carbinols. For example, sodium acetylide has been reacted with aldehydes in liquid ammonia, but the presence of ammonia involves objectionable features which are well known in the art. Solutions of alkali metals in liquid ammonia act as reducing agents and reduce acetylenic compounds to the corresponding ethylenic derivatives. Further, liquid ammonia is difficult to handle; in some instances it forms undesirable by-products; and if it is subjected to elevated temperatures and superatmospheric pressures, the reactions are admittedly hazardous. Aldehydes have also been reacted with acetylenic Grignard reagents, and with powdered potassium hydroxide in ether, but in all instances the yields of secondary acetylenic carbinols were poor and commercially impractical.

One object of this invention is to provide an improved method of reacting sodium acetylide with aldehydes; another object is to effect the reaction of sodium acetylide with aldehydes in selective reaction media and at favorable temperatures and pressures; and a further object is to provide a rapid and efficient reaction for producing secondary acetylenic carbinols in commercial yields.

In accordance with the process of the invention, an aldehyde is reacted with a dispersion of finely divided sodium acetylide, advantageously consisting mostly of particles less than 25 microns in diameter, in a selective organic liquid medium which is substantially inert with respect to the reactants and products of reactions, under controlled temperature condition, to produce the desired secondary carbinol. In a preferred and especially advantageous embodiment of the invention, the sodium acetylide is prepared according to the process of Patent No. 2,777,884, Thomas F. Rutledge et al., issued Jan. 15, 1957, Process for Producing Sodium Acetylide and Improved Sodium Acetylide Product. The sodium acetylide thus prepared is characterized principally by being a virtually white, free flowing powder, mainly less than 5 microns in diameter, which can be melted by inert liquids without undesirable coalescence of the particles. Since the presence of alkaline impurities, such as sodium hydroxide or metallic sodium, in the sodium acetylide initiates undesired aldolization or aldol condensation of the aldehyde, the sodium acetylide contains less than 0.5% of such impurities for commercially satisfactory results.

We have found that the reaction of sodium acetylide with an aldehyde can be conducted in certain organic liquid media, to form acetylenic carbinols in excellent yields based on the amount of aldehyde employed.

Broadly stated, the diluents of this invention have high dielectric constants and boiling points above the reaction temperatures but well below the boiling points of the reaction products; and the diluents are relatively inert with respect to sodium acetylide, the aldehydes, and the reaction products. Further, it is believed that a medium of high dielectric constant is preferred since many reactions of sodium acetylide are generally regarded as being ionic in nature. While the action of these organic diluents is definite, the exact manner in which they serve is not fully understood. It may be that their action is catalytic; that some of their physical factors are involved, such as solubility; or that the diluents take part in the reaction in some manner. In general, the class of solvents that are particularly useful for the present invention includes polyethers, acetals, and tertiary organic bases—all of which do not contain any functional group that reacts with either the aldehyde or the sodium acetylide.

An especially satisfactory diluent is the cyclic ether dioxane, a colorless liquid having a melting point of 11° C. and a boiling point of 101° C. Its boiling point is well above the reaction temperatures and well below the boiling points of the reaction products of this invention. Dioxane is also inert with respect to the reactants and products of reaction. Methylal, pyridine, and diethylene glycol dibutyl ether are other examples of polar materials which have been used satisfactorily in the practice of the present invention.

When reacting the improved sodium acetylide with an aldehyde in the preferred reaction media, excellent yields of secondary acetylenic carbinols are obtained according to the reaction represented by the following equations:

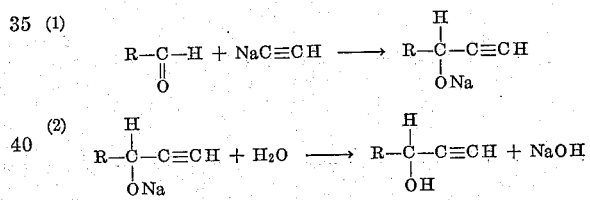

wherein R is an alkyl or aryl. As shown in Equation 1, sodium acetylide reacts with the aldehyde to form the sodium salt of the acetylenic carbinol; and as shown in Equation 2, such salt is decomposed by water to form the desired carbinol and sodium hydroxide.

Briefly, sodium acetylide is prepared according to the process of Patent No. 2,777,884 by adding a dispersion of sodium (in mineral oil, for example) in a liquid such as dioxane in a reactor equipped with a thermometer, heater, stirrer and acetylene inlet. Dry, purified acetylene is introduced into the dispersion at a temperature of from 100° C. to 105° C. After the evolution of hydrogen has stopped, the reaction resulting in the production of sodium acetylide has been completed. The sodium acetylide is dispersed in the dioxane in a fine state of subdivision, around 5 to 20 microns in diameter.

In carrying out a process of this invention, an aldehyde is added to the suspension of sodium acetylide in one of the selective liquid media at a temperature of 30° C. to 55° C. and at such a rate as to maintain an easily controlled reaction. After the desired reaction time, usually 1 to 6 hours, the reaction is cooled to about 10° C., and water is added to decompose the salt of the carbinol. The aqueous layer of sodium hydroxide is removed. The organic layer is separated, treated with an excess amount of pulverized carbon dioxide, and filtered, and the solvent and any unreacted aldehyde are separated from the carbinol formed by distillation. In view of its availability and negligible cost, water is the preferred agent for treating the sodium salt in Equation 1 above to produce the secondary acetylenic carbinol therefrom, although other suitable compounds which release hydrogen ions readily may be employed.

The following examples will serve only to illustrate 4 hour reaction time at the reaction temperature. The details as to the amounts of reactants, total volumes of pyridine or diethylene glycol dibutyl ether, reaction temperatures, time of reaction, and yields of carbinols based on the aldehydes are also tabulated below.

TABLE I.—REACTIONS OF ALDEHYDES WITH SODIUM ACETYLIDE

| Ex. | Aldehyde | Moles RCHO | Moles Sodium Acetylide | Ml Diluent | Reaction Conditions | | Yield, Mole Percent | Carbinol | B.P. | Refractive Index, $N_D^{20}$ |
|---|---|---|---|---|---|---|---|---|---|---|
| | | | | | Temp. (0° C.) | Time (hrs.) | | | | |
| 1 | Formaldehyde | 0.273 | 0.5 | 500 dioxane | 35–37 | 6 | 96.4 | Propargyl | 114–5°/762 mm | 1.4310 |
| 2 | Propionaldehyde | 1.416 | 1.416 | 927 dioxane | 31–37 | 3¾ | 86.4 | 1-pentyn-3-ol | 125°/761 mm | 1.4344 |
| 3 | n-Butyraldehyde | 2.0 | 2.0 | 1,000 dioxane | 30 | 6 | 92.8 | 1-hexyn-3-ol | 140–1°/760 mm | 1.4329 |
| 4 | Isobutyraldehyde | 1.61 | 1.61 | 923 dioxane | 35–38 | 5½ | *N.D. | 4-methyl-1-pentyn-3-ol | 118–121°/760 mm | 1.4310 |
| 5 | Isooctylaldehyde | 1.742 | 1.9 | 1,000 dioxane | 40 | 4 | N.D. | Dimethyl-1-octyn-3-ol | 112–3°/30 mm | 1.4480 |
| 6 | Benzaldehyde | 2.0 | 2.0 | ...do... | 36–39 | 5 | N.D. | 3-phenyl-1-propyn-3-ol | 81–2°/2 mm., 115–6°/16 mm. | 1.5488 |
| 7 | Isobutyraldehyde | 0.5 | 0.5 | 500 pyridine | 43–45 | 4 | 90.0 | 4-methyl-1-pentyn-3-ol | 118–121°/760 mm | 1.4310 |
| 8 | ...do... | 2.0 | 2.0 | 1,000 pyridine | 43–45 | 6 | 88.1 | ...do... | 118–121°/760 mm | 1.4310 |
| 9 | Benzaldehyde | 1.0 | 1.0 | 500 pyridine | 39–41 | 4 | 72.8 | 3-phenyl-1-propyn-3-ol | 81–2°/2 mm., 115–6°/16 mm. | 1.5488 |
| 10 | Isobutyraldehyde | 1.0 | 1.0 | 500 diethylene glycol dibutyl ether. | 39–42 | 4½ | 74.7 | 4-methyl-1-pentyn-3-ol | 118–121°/760 mm | 1.4310 |
| 11 | Benzaldehyde | 1.0 | 1.0 | ...do... | 30–33 | 4 | 74.2 | 3-phenyl-1-propyn-3-ol | 81–2°/2 mm., 115–6°/16 mm. | 1.5488 |

*Not determined.

the invention more fully and hence they are not to be construed as limiting the scope of the invention.

*Examples 1–6*

A dispersion of clean sodium metal in mineral oil, corresponding to 1.0 mole sodium, was added to 500 ml. of purified dioxane in a glass reactor. The reactor was fitted with a nitrogen inlet tube, a water-cooled condenser the exit end of which is attached to a hydrogen analyzer, a thermometer, a mechanical stirrer, an acetylene sparger tube, and a heating mantle. While a gentle stream of dry nitrogen is flowing through the reactor, heating and stirring are started. When the temperature of the dioxane reaches 65° C., the flow of nitrogen is discontinued, and dried purified acetylene gas is introduced into the dispersion at about 65° C. to 70° C. After about two hours, the evolution of hydrogen recorded by the analyzer in the exit gas stream was less than 0.5%. The flow of acetylene was discontinued, and the mix allowed to cool to room temperature in the presence of dry nitrogen. The sodium acetylide slurry in dioxane was charged into a 1 liter flask equipped with a stirrer, dropping funnel, and water cooled reflex condenser. The size of sodium acetylide particles was less than 25 microns in diameter. The mixture was heated to about 30°–55° depending on the aldehyde used, and the aldehyde added over a period of 1 to 2 hours, followed by an additional 1 to 4 hour reaction time at the desired temperature. The aldehyde was added uniformly and at a preselected rate so that the heat of reaction was sufficient to maintain the reaction at a suitable temperature without external heating. The mixture was cooled to 10° C., and then hydrolyzed with 50 ml. of cold water (10° C.). The organic layer was separated, treated with an excess of pulverized carbon dioxide, and filtered. For simplicity, the details as to amounts of reactants, total volumes of dioxane, reaction temperatures, the time of reaction, and yields of carbinols based on the aldehydes are tabulated below.

*Examples 7–11*

In a manner similar to that described for Examples 1 to 6, finely divided sodium acetylide was prepared and separated from the other materials. It was then mixed with either pyridine or diethylene glycol dibutyl ether; the resulting mixture was heated to about 30° to 45° depending on the aldehyde used; and the aldehyde was added over a period of 2 to 3 hours, followed by a 1 to 4 hour reaction time at the reaction temperature. The details as to the amounts of reactants, total volumes of pyridine or diethylene glycol dibutyl ether, reaction temperatures, time of reaction, and yields of carbinols based on the aldehydes are also tabulated below.

The date in the above table illustrates that the use of certain polar materials as the reaction media strongly favors the reaction between sodium acetylide and an aldehyde-materials such as dioxane and pyridine which do not contain any functional group that react with the aldehyde, sodium acetylide, or products of reaction. The examples in the foregoing table which show the preparation of secondary acetylenic carbinols, viz. Examples 2 to 11, and Example 12 below, illustrate the use of aldehydes of the formula RCHO wherein R is phenyl or an alkyl group containing up to seven carbon atoms. Conducting the process at atmospheric pressures and moderate temperatures, excellent yields of secondary acetylenic carbinols are obtained in a relatively short period of time (4 to 6 hours). While the yields were not specifically determined in Examples 4, 5 and 6, the conversion yields were 75.2%, 82.4% and 86.2%, respectively. Hence, the yields of carbinols would be at least as high as the conversion yields, and comparable to the yields shown in Examples 1, 2 and 3. Generally, the sodium acetylide and aldehyde are employed in stoichiometric or equimolecular proportions, although an excess of one or the other of the reactants may be used. In all the examples, total carbinol was confirmed by standard analyses, such for example, as described by Barnes and Molinini in Anal. Chem., 27, 1025–27 (1955). It is noted from the examples that the ratio of reactants to diluent ranges from about 1.5 to 4.0 moles of reactants per liter of dioxane; and that commercially satisfactory yields of carbinols were obtained in all cases with the use of reaction temperatures at or near room temperature.

The presence of acetylene in the reaction zone favors the formation of the carbinol salt, and increases the carbinol yields. Commercial acetylene intended for use in the present invention is preferably desiccated and purified, for example, by means of absorption towers packed with anhydrous calcium sulphate. Acetone is removed by passing the acetylene over activated alumina which also removes water and sulfur-phosphorous compounds. Obviously the acetylene should be very soluble in the reaction medium employed.

*Example 12*

In a manner similar to that described for Examples 7 to 11, finely divided sodium acetylide was shown to react readily with acetaldehyde in a reaction medium comprising methylal. The molar ratio of sodium acetylide to acetaldehyde was 1:1; the reaction temperature ranged from 30° to 35° C.; and 500 ml. of methylal was used. Satisfactory yields of 1-butyn-3-ol were obtained.

From actual tests, it was found that aldehydes do not react readily with sodium acetylide if the reaction medium is not a polar material, or if the reaction medium contains a functional group that reacts with the aldehyde or sodium acetylide. For example, using xylene or a mixture of xylene and dioxane as the medium, the reaction was slow and the yields were significantly decreased to as low as 10% to 20% in some instances.

In the examples, commercially satisfactory yields of carbinols were obtained by using sodium acetylide which is at least 99% pure, and which has less than 0.5% alkalinity. In fact it is extremely important that both the sodium acetylide and the reaction medium are of very low alkalinity, since the presence of free alkalinity in either substance initiates aldolization of the aldehyde. Further, the sodium metal used in the preparation of sodium dispersions should be free of superficial encrustations ordinarily found on the commercial grade of sodium. These encrustations ordinarily contain an amount of alkaline impurities which cannot be tolerated in satisfactorily conducting the process of this invention. Sodium acetylide containing free sodium (the result of using sodium dispersion containing large particles of sodium) may also result in undesired resinification of the aldehyde.

It is to be understood that the reaction should be conducted in the substantial absence of any substances which would interfere therewith. For example, it is preferred to exclude the oxygen in the air by either carrying out the reaction in the presence of an inert gas, for example, argon or helium or also nitrogen, or a mixture thereof. It has been found that the moisture and oxygen in the air will react with the sodium dispersion and with sodium acetylide in a polar liquid medium. Accordingly, the various materials and reactions mentioned above should not be exposed to the constituents of air and other interfering substances. The presence of interfering substances in any substantial amounts would adversely affect the carbinol yields.

When dioxane is intended for use in the preparation of sodium acetylide and for subsequent preparation of secondary acetylenic carbinols, it is preferably purified. For example, technical grade of dioxane is dried over sodium hydroxide pellets for at least twenty-four hours, refluxed over sodium metal for about two hours, followed by distillation. The center cut is again refluxed over fresh sodium metal for two hours, followed by distillation. Or the dioxane is dried over sodium hydroxide pellets, cooled to 10° C., and carefully treated with small portions of 40% sodium dispersion in mineral oil until no further reaction of the sodium takes place. The dioxane is then decanted and filtered.

Technical grade methylal (assay 94-95%) contains a considerable amount of water (1.3%) and methanol (1.78%). When used in the present invention, it may be purified in the following manner. It is dried over sodium hydroxide pellets for 48 hours and then redistilled. The methylal distillate (the bulk is stored over sodium hydroxide pellets) is carefully treated with small portions of 40% sodium dispersion in mineral oil until there is no further reaction with the sodium dispersion. The methylal is decanted, filtered and stored in suitable dry containers.

By passing technical grade diethylene glycol dibutyl ether repeatedly (3 to 4 times) through a column with molecular sieve type 4A, a pure and dry diethylene glycol dibutyl ether is obtained. The pyridine employed in the previous examples was purchased in purified form (A.C.S. reagent grade).

Aldehydes as prepared commercially may contain impurities which would interfere with the sodium acetylide-aldehyde reaction, such as water, alcohol and acid. When an aldehyde is intended for use in the present invention, it is dried over anhydrous magnesium sulfate and redistilled prior to use. These impurities, if not removed, would interfere with the reaction. For example, any water present in an aldehyde would react with sodium acetylide to form sodium hydroxide which would then undesirably initiate aldolization of the aldehyde.

While the preceding examples have disclosed that sodium acetylide is reacted with specific aldehydes, it will be understood that the sodium acetylide may be reacted with an aldehyde broadly to produce a secondary acetylenic carbinol. The aldehydes may be aliphatic or aromatic. Representative examples of the various classes of aldehydes include the following: saturated aliphatic-formaldehyde, propionaldehyde, chloral, and trifluoroacetaldehyde; unsaturated aliphatic-crotonaldehyde and geraniol; saturated aromatic-benzaldehyde, tolualdehyde, and bromobenzaldehyde; and unsaturated aromatic 5-phenyl-pentadienal and cinnamaldehyde.

Similarly, while the preceding examples have disclosed that sodium acetylide is reacted with an aldehyde in certain diluents such as dioxane and methylal, it will also be understood that the liquid medium comprises broadly any polyether, acetal, or tertiary organic base which is inert to the reactants and products of reaction. Representative examples of satisfactory polyether solvents, other than dioxane and diethylene glycol dibutyl ether, include the following: ethylene glycol diethyl ether; diethylene glycol diethyl ether; 2,3-butanediol diethyl ether; ethylene glycol ethyl butyl ether; 4-5-dimethyl-2-propyl-1,3-dioxolane; 1,1-dibutoxy-2-ethyl hexane; 1,1-dipropoxy-butane; 1,1-dibutoxybutane; dibutoxyphenyl methane; 1,1-dibutoxyethane; 1,1-dibutoxy-2-phenylethane; and dimethoxymethane. Representative examples of satisfactory acetal solvents other than methylal include: 1,1-dimethoxyethane; 2-methyl-1,3-dioxolane; ethylal; and di-n-propoxymethane. Representative examples of tertiary organic bases as solvents other than pyridine include substituted pyridines, quinolines and substituted quinolines. The diluents hereinabove listed have relatively high dielectric constants, and they have boiling points well above the boiling points of the carbinols, which feature permits rapid and easy separation of carbinol and diluent.

It is now readily understood that utilization of the present invention makes possible the production of secondary acetylenic carbinols in satisfactory yields. The process is rapid and efficient; and the equipment is simple and inexpensive. The reaction is conducted safely, in contrast to prior art processes involving potentially hazardous solvents such as ammonia.

The invention is not limited to the specific examples described herein but may be practiced in other ways without departing from the spirit and scope of the invention as defined in the appended claims.

What we claim is:

1. A process for preparing a secondary acetylenic carbinol which comprises reacting an aldehyde having the formula RCHO wherein R is phenyl or an alkyl group containing up to seven carbon atoms and finely-divided sodium acetylide dispersed in quinoline, said sodium acetylide being at least 99% pure and containing less than 0.5% alkaline impurities to prevent aldolization of said aldehyde, the particles of said sodium acetylide being preponderantly less than 25 microns in diameter, conducting the reaction under substantially anhydrous conditions and at a temperature of about 30° C. to about 55° C. to produce the sodium salt of said carbinol, and hydrolyzing said salt to produce the secondary acetylenic carbinol.

2. A process for preparing a secondary acetylenic carbinol which comprises reacting an aldehyde having the formula RCHO wherein R is phenyl or an alkyl group containing up to seven carbon atoms and finely-divided sodium acetylide dispersed in pyridine, said sodium acetylide being at least 99% pure and containing less than 0.5% alkaline impurities to prevent aldolization of said aldehyde, the particles of said sodium acetylide being preponderantly less than 25 microns in diameter, conducting the reaction under substantially anhydrous conditions and at a temperature of about 30° C. to about 55° C. to produce the sodium salt of said carbinol, and hydrolyzing said salt to produce the secondary acetylenic carbinol.

3. A process for preparing a secondary acetylenic carbinol which comprises reacting an aldehyde having the formula RCHO wherein R is phenyl or an alkyl group containing up to seven carbon atoms and finely-divided sodium acetylide dispersed in quinoline, said sodium acetylide being at least 99% pure and containing less than 0.5% alkaline impurities to prevent aldolization of said aldehyde, the particles of said sodium acetylide being preponderantly less than 25 microns in diameter, conducting the reaction in a reaction zone under substantially anhydrous conditions and at a temperature of about 30° C. to about 55° C. to produce the sodium salt of said carbinol, maintaining an inert gas atmosphere in the reaction zone and introducing purified acetylene into contact with said sodium acetylide, aldehyde and quinoline, during the course of the reaction, and hydrolyzing said salt to produce the secondary acetylenic carbinol.

4. A process for preparing a secondary acetylenic carbinol which comprises reacting an aldehyde having the formula RCHO wherein R is phenyl or an alkyl group containing up to seven carbon atoms and finely-divided sodium acetylide dispersed in pyridine, said sodium acetylide being at least 99% pure and containing less than 0.5% alkaline impurities to prevent aldolization of said aldehyde, the particles of said sodium acetylide being preponderantly less than 25 microns in diameter, conducting the reaction in a reaction zone under substantially anhydrous conditions and at a temperature of about 30° C. to about 55° C. to produce the sodium salt of said carbinol, maintaining an inert gas atmosphere in the reaction zone and introducing purified acetylene into contact with said sodium acetylide, aldehyde and pyridine, during the course of the reaction, and hydrolyzing said salt to produce the secondary acetylenic carbinol.

References Cited by the Examiner

UNITED STATES PATENTS

| | | | |
|---|---|---|---|
| 2,125,384 | 8/1938 | Macallum | 260—618 |
| 2,345,170 | 3/1944 | Zeltner et al. | 260—638 |
| 2,455,058 | 11/1948 | Herman | 260—665 |
| 2,777,884 | 1/1957 | Rutledge et al. | 260—618 |
| 2,996,552 | 8/1961 | Blumenthal | 260—617 |
| 3,028,423 | 4/1962 | Blumenthal | 260—533 |

LEON ZITVER, *Primary Examiner.*